April 25, 1961 A. CUPELLA 2,981,797

AUTOMATIC FREQUENCY CONTROL RECEIVER FOR THE RECEPTION OF RADIO SIGNALS FOR COMMUNICATIONS THROUGH TELETYPEWRITERS

Filed May 9, 1956

INVENTOR.
ALDO CUPELLA
BY Wm. Walter Owen
ATTY.

Patented Apr. 25, 1961

1

2,981,797

AUTOMATIC FREQUENCY CONTROL RECEIVER FOR THE RECEPTION OF RADIO SIGNALS FOR COMMUNICATIONS THROUGH TELETYPEWRITERS

Aldo Cupella, Milan, Italy, assignor of one-half to Soc. Metallotecnica, Milan, Italy, a corporation of Italy Filed May 9, 1956, Ser. No. 583,831

Claims priority, application Italy June 10, 1955

10 Claims. (Cl. 178—88)

This invention relates to a receiver for frequency-shift radio telegraph systems, and more particularly to teletypewriter systems, the receiver preferably having follow-up automatic frequency control.

To reduce the interference produced by noise and other radio signals, it is desirable that receivers for radio controlled teletypewriter systems be highly selective. Since a proper reception with a minimum of error in this type of communications depends principally upon a high stability of the radio reception circuits, it is common practice in modern equipment of this type to provide apparatus having quartz-crystal-controlled high frequency circuits for operation on one or more fixed frequencies. It is very difficult to provide a satisfactory freely tunable receiving system. It is known in the art to use automatic frequency control apparatus for maintaining the received signal centered within the pass-band. In the known receivers for frequency shift systems, the selectivity is limited by the necessity of providing a pass-band wide enough to accept both the mark and the space signals without excessive distortion of the keying characteristic.

The primary objective of the present invention is to provide a freely tunable, highly selective and stable radio receiver for the reception of radio telegraph frequency-shift signals for teletypewriter systems.

The invention relates to an arrangement for a receiver of frequency keyed telegraphic signals, wherein circuit apparatus including limiters passes both mark and space signals, said receiver preferably including a follow-up type automatic frequency control, characterized by a single filter following said circuit apparatus having a pass-band narrower than the frequency-shift for selecting one of the mark and space signals while rejecting the other, and a circuit including an amplitude detector for utilizing the selected signal to operate a teletypewriter.

According to an auxiliary feature of the invention, said circuit apparatus also includes at least one frequency convertor with an associated local oscillator, and the automatic frequency control is effected by apparatus coupled between the filter output and the local oscillator which maintains the selected signal substantially at a given frequency within the filter pass-band. The automatic frequency control apparatus may include a discriminator having circuits tuned to frequencies equally spaced above and below the given frequency, with an output which acts on the local oscillator to correct any frequency deviation. The control is of the follow-up type so that in the absence of a signal the frequency remains fixed at the last selected value: for example, the local oscillator is tuned by a condenser with mechanical means driven by the discriminator for varying its capacitance. The automatic frequency control may be applied to the last of a plurality of conversion stages.

According to another auxiliary feature of the invention, a device is coupled between the filter and the amplitude detector for regenerating the signals, the device being triggered by the selected signal passing through the filter. The device may be a normally blocked relaxation oscillator including a thyratron having a source of negative bias potential connected to its grid, so that signals exceeding a threshold level trigger the thyratron, which is then synchonized to produce a regenerated signal of the same frequency.

According to a further auxiliary feature of the invention, the output signal from the thyratron relaxation oscillator is supplied to both the amplitude detector and to the automatic frequency control apparatus.

A possible form of embodiment of the device according to the present invention is shown, only by way of an example, in the accompanying drawings, wherein.

Figure 1:
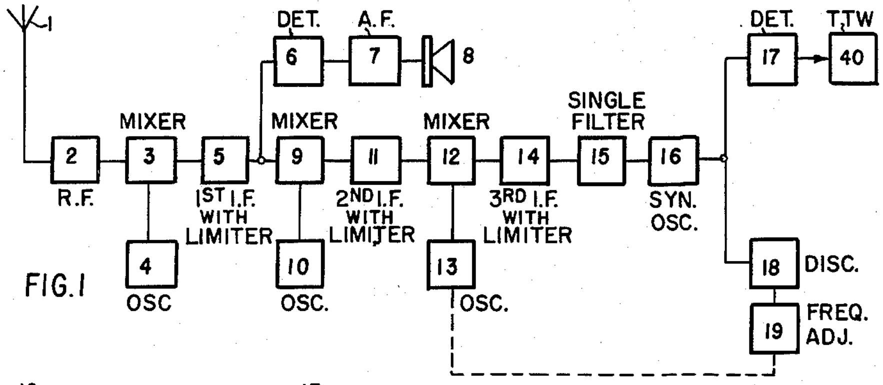
Figure 1 is a diagrammatic representation of said embodiment.

Making now reference to Fig. 1, the keyed radio signal for teletypewriter communications as received thru the antenna 1 is selected by the high frequency circuit 2 and is mixed in converter 3 with the output of the variable frequency local oscillator 4 to produce an intermediate frequency signal. The signal is then amplified by the intermediate frequency amplifiers 5 and converted to a second intermediate frequency by the converter circuit 9 which is supplied by the quartz-crystal-controlled local oscillator 10. The amplifying and limiting second intermediate frequency group 11, effects a further amplification and begins to eliminate those noises taking place as amplitude modulation of the signals. In converter 12, by mixing with the output of the variable frequency local oscillator 13, the signal is converted to a still lower frequency (third intermediate frequency). The amplifying and limiting third intermediate frequency group 14 effects the elimination of any remaining amplitude modulations of the signal and by its amplification minimizes the "fading" effects of the signal.

The filter circuit 15 has a passing band lower than the frequency shift of the frequency keying of the signal and therefore allows the passage of but only one of the two frequencies corresponding respectively to the mark and space pulses of the signal keying. The receiver may be tuned so that the output of filter circuit 15 includes only the mark frequency signals or only the space frequency signals. Assume that it is tuned for the mark signals. Then filter circuit 15 rejects the space signals and any noise or other signals falling outside the narrow pass band.

The electronic blocking device 16, which may be a synchronized oscillator, is provided to regenerate the filter output signals, which are distorted by the narrow pass band. This device 16 releases (becomes unblocked and operative) responsive to output signals above a threshold level from the filter circuit 15, and is synchronized to produce a regenerated signal at the same frequency. Since noise entering the receiver is suppressed by the limiters or rejected by the filter circuit, it does not unblock the device 16. The regenerated signal at the output of device 16 is thereby an amplitude keyed signal and is sent to the electronic-electromechanical or electronic device 17 for operating, either directly or indirectly, a local or remote teletypewriter 40. At the same time the output signal from the electronic blocking device 16 is sent to the discriminator 18, which latter, thru the device 19, operates the local oscillator 13 so as to keep centered the frequency of the signal used for releasing the device 16.

In such a manner, the transmitter oscillator as well as the receiver oscillators need not be extremely stable, since the herein described device allows the automatic engagement (or tracking) of the receiver to the frequency of the useful signal received. From the above description it clearly appears that the same radio receiver arranged according to the scheme of Fig. 1, besides performing its service as a radio receiver for teletypewriters on any frequency within the band covered by the high frequency group, is at the same time an excellent professional receiver for radio telegraphic signals, amplitude or frequency keyed, obtained by Morse Code thru either manual or automatic telegraphy. And indeed in case of automatic telegraphy the same device 17 may drive a relay of an automatic telegraphic machine; in case of manual telegraphy and headset reception the same device 17 may drive an acoustic frequency oscillator for generating the headset signal.

On the other hand, the operations of discriminator 18, device 19, filter circuit 15 and electronic blocking device 16 remain unaltered even if the incoming signal is amplitude keyed.

Figure 2:
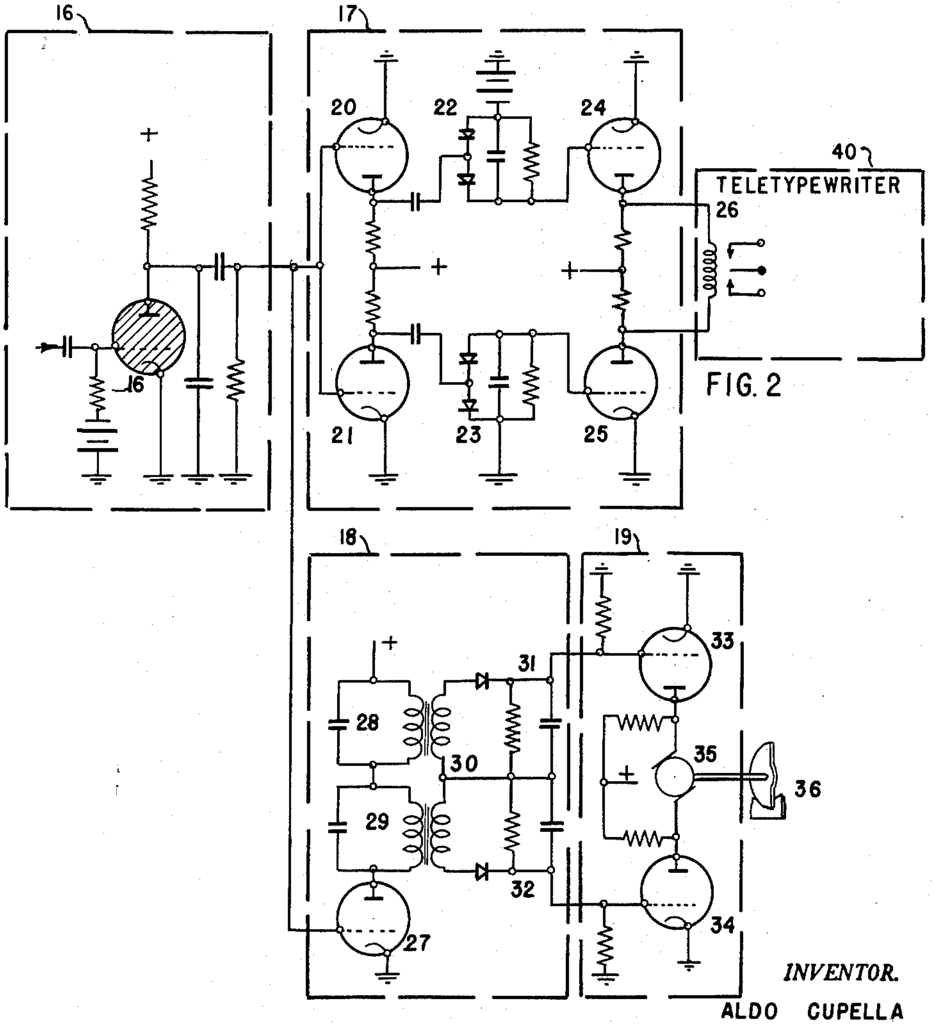
Figure 2 is a diagrammatic view of some details of the same embodiment.

Therefore, said radio receiver may be used interchangeably, on its whole frequency band, for reception in the teletypewriter traffic (with amplitude or frequency keyed signals) in the manual telegraphic traffic (with amplitude or frequency keying) in the automatic telegraphic traffic (with amplitude or frequency keyed signals). For the purpose of also permitting audio reception with said radio receiver, according to the arrangement of Fig. 1, the detecting circuit 6, the audio frequency amplifier 7 and a loudspeaker 8 make possible the audio reception. Fig. 2 is an example of embodiment of the devices 16 and 17 of Fig. 1.

According to the scheme on Fig. 2, the thyratron oscillator 16 is a relaxation oscillator blocked by a negative voltage on its grid, and in response to an output signal from the filter circuit 15 it is released and synchronized on the same signal frequency. The pulse signal is then sent to the grids of the tubes 20 and 21 which further amplify it and thru the rectifying groups 22 and 23 convert it respectively into a positive pulse on the grid of the tube 24 and into a negative pulse on the grid of the tube 25. Since the grid of the tube 24 is negatively biased beyond cut off, the positive pulse, coming on its grid as a signal, releases it; whilst the negative pulse coming on the grid of the tube 25 causes it to be blocked. Consequently, the coil 26 of the relay of a teletypewriting machine 40, in the absence of a signal, conducts current from tube 25; when a signal is present, it conducts current in the opposite direction from the tube 24, causing thus the operation of the same teletypewriting machine.

When the thyratron oscillator 16 is released by the signal, and generates an oscillation having the same frequency as said signal it also drives the grid of the tube 27. The two primary windings of the transformers 28 and 29 are tuned so as to form together with the circuit 30 of their secondary windings, a discriminator having a 0 voltage across the points 31 and 32 when the signal frequency on the 27 tube grid is correctly, the central one of the filter 15 preceding the oscillator 16. The potential difference between the points 31 and 32 becomes either a positive or a negative one according to the driving frequency of the tube 27 and of a higher or lower value in respect of the zero frequency of the discriminator 18. In this way, between the plates of the tubes 33 and 34, which are grid driven by the discriminator 18, and assuming them balanced in the absence of a signal, there will be a zero potential difference, if the signal has a frequency which value is equal to that of the central frequency of the filter 15, whereas there will be a positive or negative potential difference if the frequency is shifted in respect of the central one. Such potential difference may thus cause the rotation of the motor 35 driving the variable capacitor 36 of the free oscillator 13. In such a way, any frequency variation of the signal outgoing from the filter may be compensated by a suitable variation of the variable capacitor 36; in this manner performing an automatic frequency control and following in the receiver. Though for descriptive purposes the present invention has been shown only thru embodiments given as a way of example, it is to be understood that many variations and additions are possible without departing from the scope of the same invention as defined in the following claims.

What is claimed is:

1. An arrangement for the reception of frequency keyed telegraphic signals, comprising a source of input signals comprising mark and space signals at respective frequencies separated by a given shift value, circuit apparatus including limiting means coupled to said source and passing both mark and space signals, only one filter coupled to said circuit apparatus, said filter having a pass band narrower than said frequency shift for passing one of said mark and space signals and rejecting the other, and means including amplitude detection means coupled to said filter for producing output signals for operating a utilization device responsive only to said one signal passing through the filter.

2. An arrangement according to claim 1, further including means coupled between said filter and said amplitude detection means for regenerating signals having a given amplitude responsive to said one signal and having substantially zero amplitude in the absence of said one signal.

3. An arrangement according to claim 2, wherein said regenerating means comprises a normally blocked oscillator which is triggered and synchronized responsive to said one signal to produce a regenerated signal of the same frequency as said one signal, and includes means for preventing triggering in response to noise signals.

4. An arrangement according to claim 3, further including automatic frequency control apparatus controlled by said regenerated signal for maintaining said one signal substantially at a given frequency within said pass band.

5. An arrangement according to claim 4, wherein said normally blocked oscillator comprises a relaxation oscillator including a thyratron having a control grid connected to a source of negative bias potential and to said filter, so that only signals exceeding a given level trigger the thyratron.

6. In an arrangement for the reception of frequency keyed telegraphic signals, in combination, a source of input signals comprising mark and space signals at respective frequencies separated by a given shift value, a single filter having input and output terminals, circuit apparatus which passes both mark and space signals coupled between said source and the input terminals of the filter, said apparatus comprising selective means, amplifying means, limiting means, and frequency converting means, said filter having a narrow pass band to pass one of said mark and space signals and to reject the other, means coupled to said output terminals for regenerating a signal at the same frequency as said one signal passing through the filter, means for producing output signals for operating a utilization device responsive to the regenerated signal, at least one local oscillator associated with said frequency converting means, and automatic frequency control apparatus coupled in circuit between the output of said regenerating means and said local oscillator for controlling the frequency of the oscillator and thereby maintaining said one signal passed by the filter substantially at a given frequency within said pass band, the path through said single filter being the only path for signals from said source to reach said regenerating means, and both the output signals and the automatic frequency control being responsive only to said one signal as passed by said filter and regenerated by said regenerating means.

7. An arrangement according to claim 6, wherein said regenerating means comprises a relaxation oscillator including a thyratron having a control grid, a source of negative bias potential connected to the grid for normally blocking said thyratron, means coupling the grid to said filter output terminals to trigger and synchronize the relaxation oscillator responsive to said one signal.

8. An arrangement according to claim 7, wherein said automatic frequency control apparatus includes a tuning control for said local oscillator and a discriminator for supplying control current to the tuning control, the discriminator including respective circuits tuned to frequencies equally spaced above and below said frequency, so that responsive to said one signal deviating from the given frequency the discriminator produces an output which causes the tuning control to change the local oscillator frequency in a direction to correct for the deviation, and responsive to said one signal being at the given frequency or responsive to no signal passing through the filter the discriminator net output is zero, causing the tuning control and the local oscillator frequency to remain fixed.

9. An arrangement according to claim 1 wherein said utilization device comprises a teletypewriter and said output signals comprise direct current signals for operating said teletypewriter.

10. An arrangement according to claim 6 in which said output signals are direct current signals having an amplitude which is a function only of the amplitude of the said regenerated alternating current signals.

References Cited in the file of this patent

UNITED STATES PATENTS

| | | |
|---|---|---|
| 2,341,649 | Peterson I | Feb. 15, 1944 |
| 2,462,470 | Crosby | Feb. 22, 1949 |
| 2,492,795 | Goldstine | Dec. 17, 1949 |
| 2,507,735 | Peterson II | May 16, 1950 |
| 2,541,128 | Violet | Feb. 13, 1951 |
| 2,644,035 | Trevor | June 30, 1953 |
| 2,668,871 | Violet et al. | Feb. 9, 1954 |
| 2,839,604 | Shank | June 17, 1958 |